United States Patent [19]

Sakai et al.

[11] Patent Number: 5,309,945
[45] Date of Patent: May 10, 1994

[54] VALVE ASSEMBLY FOR GAS CYLINDER

[75] Inventors: Mitsunori Sakai; Masakatu Kawahara; Teruo Hatori, all of Amagasaki, Japan

[73] Assignee: Kabushiki Kaisha Neriki, Hyogo, Japan

[21] Appl. No.: 115,738

[22] Filed: Sep. 3, 1993

[30] Foreign Application Priority Data

Sep. 9, 1992 [JP] Japan .................................. 4-268197
Dec. 4, 1992 [JP] Japan .................................. 4-350598

[51] Int. Cl.$^5$ .............................................. B65B 31/06
[52] U.S. Cl. ...................................... 137/861; 141/18
[58] Field of Search ............... 137/861, 877, 878, 493, 137/493.8; 222/3; 141/18

[56] References Cited

U.S. PATENT DOCUMENTS

| | | | |
|---|---|---|---|
| 2,645,241 | 7/1953 | Riede | 141/18 |
| 3,885,589 | 5/1975 | Lung | 137/613 |
| 4,210,168 | 7/1980 | Yonezawa | 137/454.5 |
| 4,844,111 | 7/1989 | Pritchard et al. | 137/71 |
| 5,063,976 | 11/1991 | Oi et al. | 141/18 |

FOREIGN PATENT DOCUMENTS 3-219172  9/1991  Japan .................................. F16K 1/30

*Primary Examiner*—John C. Fox
*Attorney, Agent, or Firm*—Bacon & Thomas

[57] ABSTRACT

A gas inlet (4), a stop value (7), a pressure reducing valve (8) and a gas outlet (5) are arranged in series within a valve casing (3). The gas outlet (5) and an outlet (7b) of said stop valve (7) are communicated with each other by a gas charging passage (10) provided with a check valve (11). The gas outlet (5) is communicated with a secondary safety valve (28) by a gas inducting passage (29). When a gas cylinder (1) is charged with a gas, a gas charging mouthpiece (14) is attached to the gas outlet (5). Thereupon, an opening or closing portion (A) provided in the gas inducting passage (29) is closed by an actuating portion (30) provided in the mouthpiece (14). Thereby, a high-pressure gas is not released from the secondary safety valve (28).

10 Claims, 16 Drawing Sheets

VALVE ASSEMBLY FOR GAS CYLINDER

BACKGROUND OF THE INVENTION

1. Field of the Invention

The present invention relates to a valve assembly adapted to be attached to a gas cylinder containing a compressed gas and a liquefied gas for use in taking out and charging the gas and, more specifically, to a valve assembly enabling to take out a high-pressure gas within a gas cylinder from a gas outlet in a pressure-reduced state through a pressure reducing valve when the gas is taken out and to charge a high-pressure gas into the gas cylinder from the gas outlet when the gas is charged.

2. Description of the Prior Art

Among such valve assemblies, there is a one having the following construction as disclosed in the Japanese Patent Publication JPA 3-219172 which was proposed formerly by one of the inventors of the present invention.

Between a gas inlet and a gas outlet within a valve casing, a pressure reducing valve is disposed in series relative to a stop valve while a gas charging passage is provided in parallel relative to the pressure reducing valve. The gas charging passage is provided with a bypass check valve which serves to block a flow from the gas inlet to the gas outlet. A secondary safety valve is connected to an outlet of the pressure reducing valve and is provided with a backup pusher member.

The above-mentioned valve assembly is used as follows at the time of gas charging.

Prior to the gas charging working, a backup for the secondary safety valve is applied by the pusher member so as to prevent a blowout of the gas from the secondary safety valve which might be caused by a net pressure of the high-pressure gas to be charged. Then, the high-pressure gas is supplied to the gas outlet under an open condition of the stop valve. Thereupon, the high-pressure gas is supplied from the gas outlet to the gas cylinder through the bypass check valve and the gas inlet in order. After completion of the gas charging working, the backup for the safety valve is released.

Now, since such valve assemblies are necessarily fabricated in a compact structure corresponding to a size of the gas cylinder, also the secondary safety valve is made as small as possible.

At the time of gas charging, since it is necessary that an operator carries out the backup operation and the backup releasing operation of the small safety valve by his or her fingers, those operations are so difficult that the gas charging working takes much trouble. When the operator having gloves on effects the working, that problem becomes a great abuse because his or her fingers can't move freely.

Further, when the operator forgets the backup releasing operation by mistake after completion of the gas charging, the secondary safety valve doesn't work at the time of taking out the gas.

SUMMARY OF THE INVENTION

It is an object of the present invention to make a gas charging working easier and to prevent an erroneous operation of a secondary safety valve.

For accomplishing the above-mentioned object, for example as shown in FIGS. 1 through 7, or FIGS. 20 through 22, FIG. 25 or FIG. 26 respectively, a valve assembly according to the present invention is constructed as follows.

Between a gas inlet 4 and a gas outlet 5 within a valve casing 3, a pressure reducing valve 8 is disposed in series relative to a stop valve 7. A gas charging passage 10 is provided in parallel relative to the pressure reducing valve 8. The gas charging passage 10 is provided with a check valve 11 which serves to block a flow from the gas inlet 4 to the gas outlet 5. A gas charging mouthpiece 14 is mounted to the gas outlet 5. A gas inducting passage 29 of the secondary safety valve 28 is communicated with the gas outlet 5 while an opening or closing portion A adapted to be closed by an actuating portion 30 of the gas charging mouthpiece 14 is arranged in the gas inducting passage 29.

Incidentally, the opening or closing portion A may be closed by an intermediate member 92 adapted to be driven by an actuation force of the actuating portion 30 (for example, as shown in FIG. 7 or FIG. 22) or may be closed directly by the actuating portion 30 (for example, as shown in FIG. 17, FIG. 23 or FIG. 24).

The present invention functions as follows, for example as illustrated in FIGS. 1 through 7.

During a transportation or a storage of a gas cylinder 1, the stop valve 7 is kept closed.

When the gas is taken out, the stop valve 7 is opened. Thereupon, a high-pressure gas within the gas cylinder 1 flows out from the gas outlet 5 through the gas inlet 4 and the pressure reducing valve 8. When the gas pressure in the gas outlet 5 increases abnormally due to the biting of a foreign substance into the pressure reducing valve 8 and/or the first check valve 11 or the like during taking out of the gas, that abnormal pressure is released from the secondary safety valve 28.

When the high-pressure gas is charged into a vacant gas cylinder 1, firstly the gas charging mouthpiece 14 is connected to the gas outlet 5. Thereupon, the opening or closing portion A of the gas inducting passage 29 of the secondary safety valve 28 is closed by the actuating portion 30 of the gas charging mouthpiece 14.

Subsequently, the high-pressure gas is supplied from the gas charging mouthpiece 14 under the open condition of the stop valve 7. Thereupon, the gas is charged into the gas cylinder 1 from the gas outlet 5 through the first check valve 11 and the gas inlet 4. Since the opening or closing portion A is kept closed during this gas charging, the high-pressure gas which has been supplied to the gas outlet 5 doesn't flow into the secondary safety valve 28. Therefore, it can be surely prevented that the gas blows out from the secondary safety valve 28.

Since the present invention is constructed and functions as mentioned above, the following advantages can be obtained.

During the gas charging, when the gas charging mouthpiece is connected to the gas outlet of the valve assembly, the opening or closing portion of the gas inducting passage of the secondary safety valve is closed by the actuating portion of the gas charging mouthpiece, so that the high-pressure gas doesn't flow into the secondary safety valve. Therefore, it becomes unnecessary that the operator carries out the backup operation and the backup releasing operation for the secondary safety valve. As a result, the gas charging working becomes easy. Further, since the operator doesn't have to operate the secondary safety valve during the gas charging, an erroneous operation of the safety valve is not caused by a mismanipulation.

BRIEF DESCRIPTION OF THE DRAWINGS

The above and other objects, advantages and features of the invention will become apparent when considered with the following detailed description and accompanying drawings wherein:

FIGS. 1 through 8 show a first embodiment of a valve assembly according to the present invention;

FIG. 1 is a system diagram of the valve assembly;

FIG. 2 is a system diagram showing a state for detecting a pressure within a gas cylinder in the valve assembly;

FIG. 3 is an elevation view of the valve assembly;

FIG. 4 is a sectional view taken along the directed line IV-IV in FIG. 3;

FIG. 5 is a sectional view taken along the directed line V—V in FIG. 3;

FIG. 6 is an enlarged view of the directed VI portion in FIG. 5;

FIG. 7 shows a gas charging state of the valve assembly and a view corresponding to FIG. 6;

FIG. 8 shows an actuating state of a means for forcibly opening a first check valve mounted within the valve assembly;

FIG. 13 shows a variant example of a piston of the means for forcibly opening the valve;

FIG. 20 is a system diagram of the valve assembly;

FIG. 21 shows a gas taking-out state of the valve assembly and is a view corresponding to FIG. 6;

FIG. 22 shows a gas charging state of the valve assembly and is a view corresponding to FIG. 7;

DESCRIPTION OF THE PREFERRED EMBODIMENTS

First Embodiment

FIGS. 1 through 8 show a first embodiment of the present invention.

Figure 1:
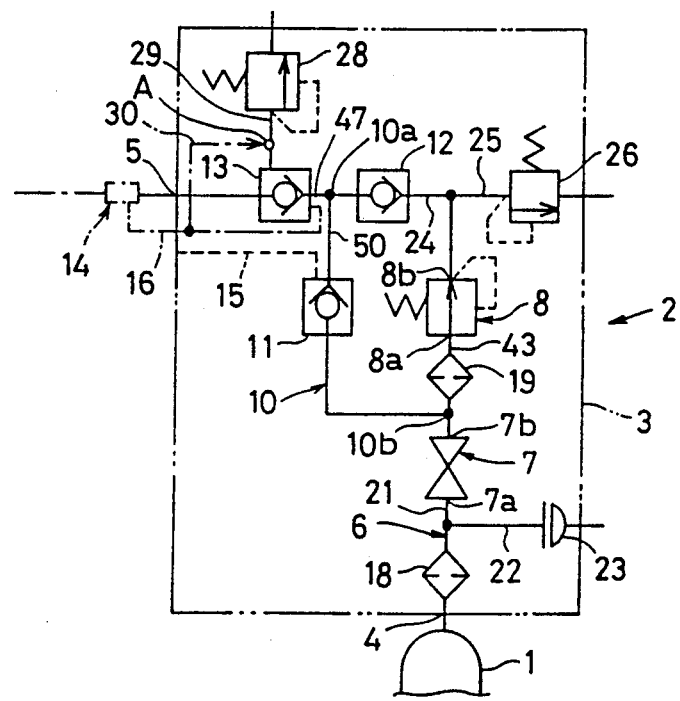

As shown in the system diagram of FIG. 1, a valve assembly 2 fixedly secured to a gas cylinder 1 has a valve casing 3 provided with a gas inlet 4 and a gas outlet 5 formed in its outer surface. A stop valve 7 and a pressure reducing valve 8 are disposed in order in a gas taking-out passage 6 extending from the gas inlet 4 to the gas outlet 5.

Between the gas outlet 5 and an outlet 7b of the stop valve 7, there are provided a gas charging passage 10 which bypasses the pressure reducing valve 8. In the gas charging passage 10, there is provided a first check valve 11 which serves to block a gas flow from the stop valve outlet 7b to the gas outlet 5. Between an outlet 8b of the pressure reducing valve 8 and an inlet 10a of the gas charging passage 10, there is provided a second check valve 12 which serves to block a gas flow from the gas outlet 5 to the pressure reducing valve outlet 8b. Further, between the first and the second check valves 11, 12 and the gas outlet 5, there is provided a third check valve 13 which serves to block gas flows from the gas outlet 5 to the respective check valves 11, 12.

A gas charging mouthpiece 14 is connectable to the gas outlet 5. In the gas charging mouthpiece 14, there is provided a means 16 for forcibly opening the third check valve 13. Further, in the valve casing 3, there is provided another means 15 for forcibly opening the first check valve 11.

Between the gas inlet 4 and a gas inlet 7a of the stop valve 7, there is provided a valve assembly filter 18 while between the outlet 10b of the gas charging passage 10 and an inlet 8a of the pressure reducing valve 8, there is provided a primary filter 19 for the pressure reducing valve 8.

A gas inducting passage 22 of a primary safety valve 23 is communicated with an inlet passage 21 of the stop valve 7. A gas inducting passage 25 of a safety valve 26 on the outlet side of the pressure reducing valve 8 is communicated with an outlet passage 24 of the pressure reducing valve 8. Further, a gas inducting passage 29 of a secondary safety valve 28 is communicated with the gas outlet 5 while an opening or closing portion A is provided in the gas inducting passage 29. This opening or closing portion A is adapted to be closed by an actuating portion 30 provided in the means 16 of the gas charging mouthpiece 14.

The valve assembly 2 is used as follows. Incidentally, the gas cylinder 1 is charged with the high-pressure gas whose pressure is about 300 kgf/cm² which is two times a conventional charge pressure (about 150 kgf/cm²).

When the stop valve 7 is opened at the time of taking out the gas, the high-pressure of the gas within the gas cylinder 1 is reduced to a predetermined pressure by the pressure reducing valve 8. After that, the gas can be taken out from the gas outlet 5 through the second check valve 12 and the third check valve 13 in order.

When a pressure in the gas outlet 5 increases abnormally due to the biting of a foreign substance into the first check valve 11 and so on during the gas taking-out, the abnormal pressure is adapted to be released from the secondary safety valve 28. Further, also when the pressure in the gas outlet 5 increases abnormally due to the biting of a foreign substances into the pressure reducing valve 8 and so on, the abnormal pressure is adapted to be released from the secondary safety valve 28 or the safety valve 26.

Incidentally, when a releasing capacity of the secondary safety valve 28 is set to a sufficient value, the safety valve 26 and the gas inducting passage 25 may be omitted.

When the reversely flowing gas has invaded into the gas outlet 5 due to any reason during the gas taking-out, the reverse flow is blocked by the third check valve 13 so as to prevent the interior of the gas cylinder 1 from being contaminated by the reversely flowing gas.

When a residual pressure within the gas cylinder 1 has decreased to a predetermined pressure by repetition of the gas taking-out, the second check valve 12 is closed automatically by a spring (herein, not illustrated) and also the third check valve 13 is closed automatically by a spring (herein, not illustrated). Thereby, further gas taking-out is prevented, so that the residual pressure within the gas cylinder 1 is maintained at the predetermined pressure. As a result, even when the stop valve 7 is kept open by mistake, it can be prevented that the atmosphere enters the vacant gas cylinder 1.

When the high-pressure gas is charged into the vacant gas cylinder 1, firstly the gas charging mouthpiece 14 is connected to the gas outlet 5. Thereupon, the third check valve 13 is opened by a manual operation (or a pressure of the gas) through the forcibly valve-opening means 16 provided in the mouthpiece 14. Simultaneously with the connection of the mouthpiece 14, the opening or closing portion A of the gas inducting passage 29 of the secondary safety valve 28 is closed by the actuating portion 30 provided in the mouthpiece 14. Subsequently, the high-pressure gas is supplied from the gas charging mouthpiece 14 under the open condition of the stop valve 7. Thereupon, the gas passes from the gas outlet 5 through the third check valve 13, the first check valve 11 and the stop valve 7 in order so as to be charged into the gas cylinder 1 from the gas inlet 4.

Since the opening or closing portion A is closed during that gas charging, the high-pressure gas which has been supplied to the gas outlet 5 doesn't enter the secondary safety valve 28. Therefore, the gas is prevented from blowing out from the secondary safety valve 28.

When a vacuum suction for the gas cylinder 1 is carried out prior to the gas charging, the third check valve 13 and the stop valve 7 are opened and the first check valve 11 is opened by the means 15.

Now, when the gas is taken out at the high pressure from the gas cylinder 1, the first check valve 11 is opened by the means 15 and the stop valve 7 is opened. Thereupon, the high-pressure gas within the gas cylinder 1 can be taken out from the gas outlet 5 through the stop valve 7, the first check valve 11 and the third check valve 13.

When confirming a pressure within the gas cylinder 1 at the time of receiving it or confirming a pressure within the gas cylinder 1 during its storage, the valve assembly 2 is operated as follows.

Figure 2:
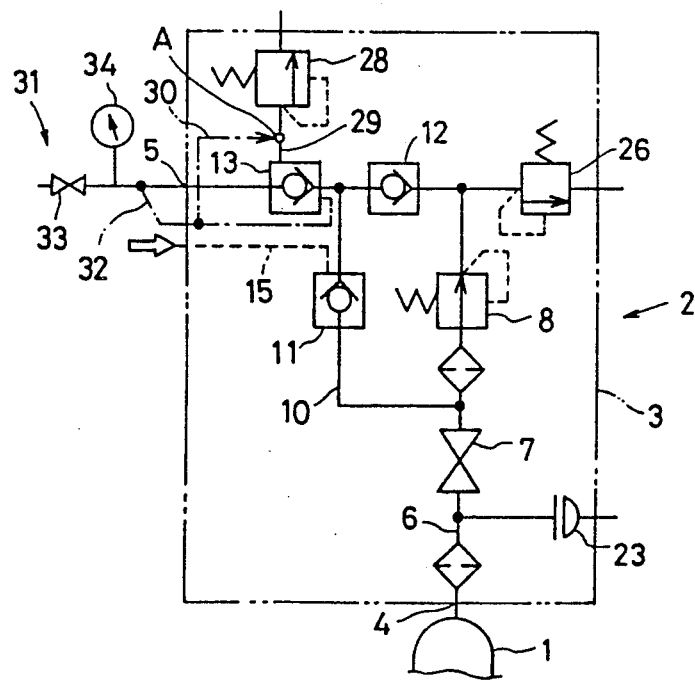

As shown in FIG. 2, a pressure detection means 31 is connected to the gas outlet 5. Thereupon, the third check valve 13 is opened forcibly by still another means 32 for forcibly opening valve provided in the pressure detection means 31. This means 32 is constructed similarly to aforementioned means 16 and the opening or closing portion A is adapted to be closed by the actuating portion 30.

Under such a condition that a vent valve 33 of the pressure detection means 31 is closed and the stop valve 7 is opened, the first check valve 11 is made to open by the means 15. Thereupon, the gas within the gas cylinder 1 flows into the pressure detection means 31 through the stop valve 7, the first check valve 11 and the third check valve 13 in order so that its gas pressure can be indicated by a pressure gauge 34.

Figure 3:
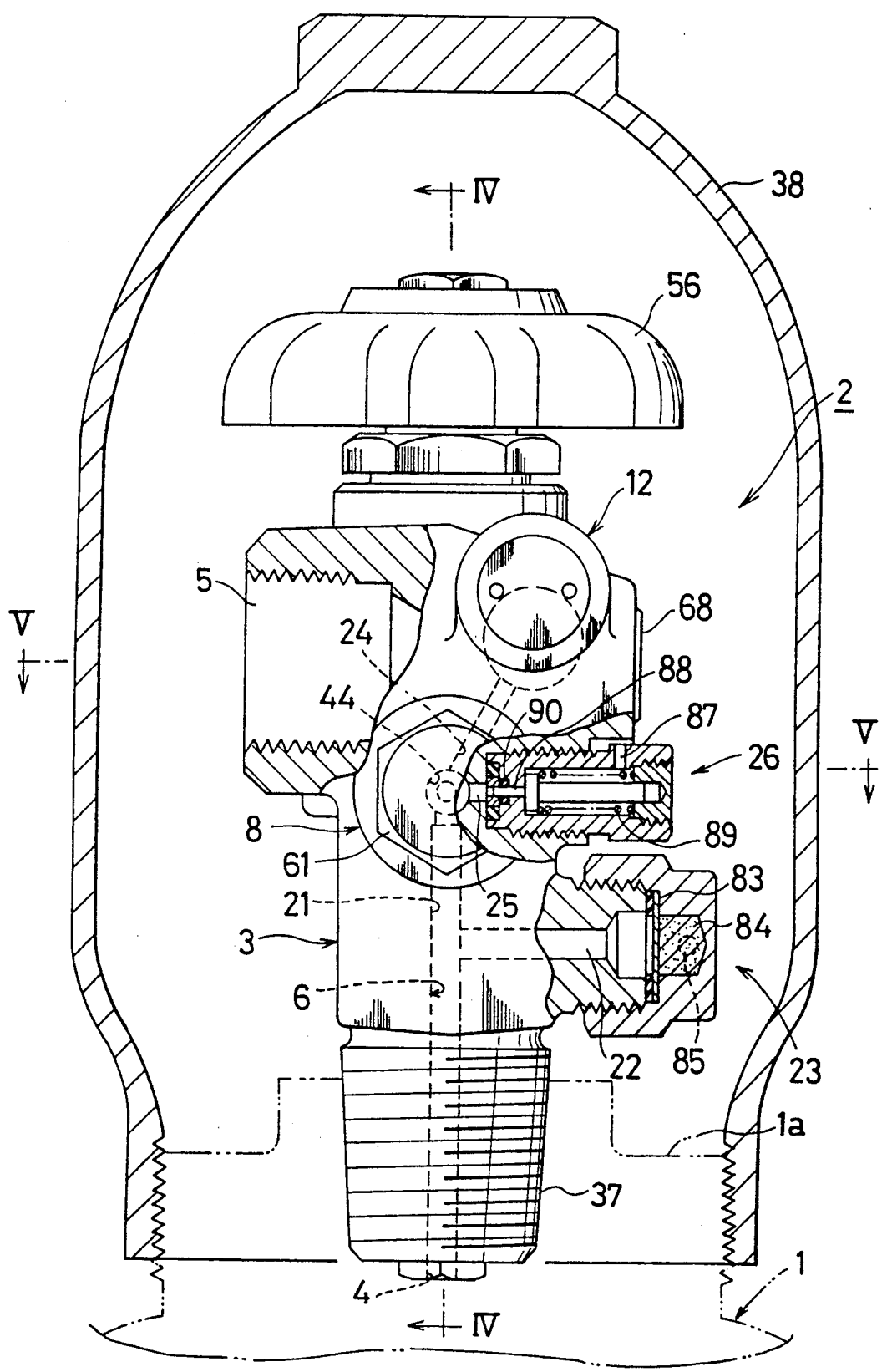
Figure 4:
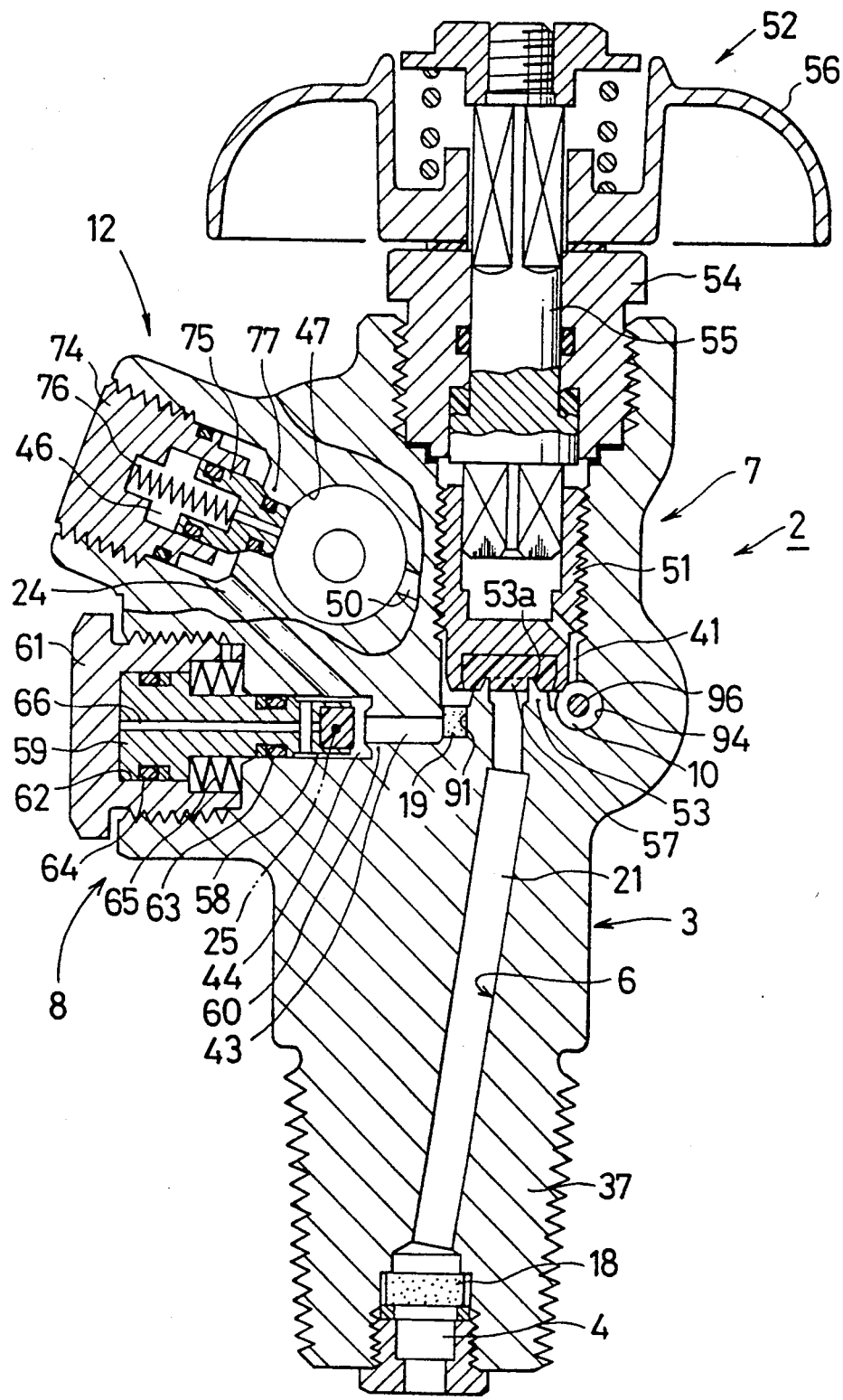
Figure 5:
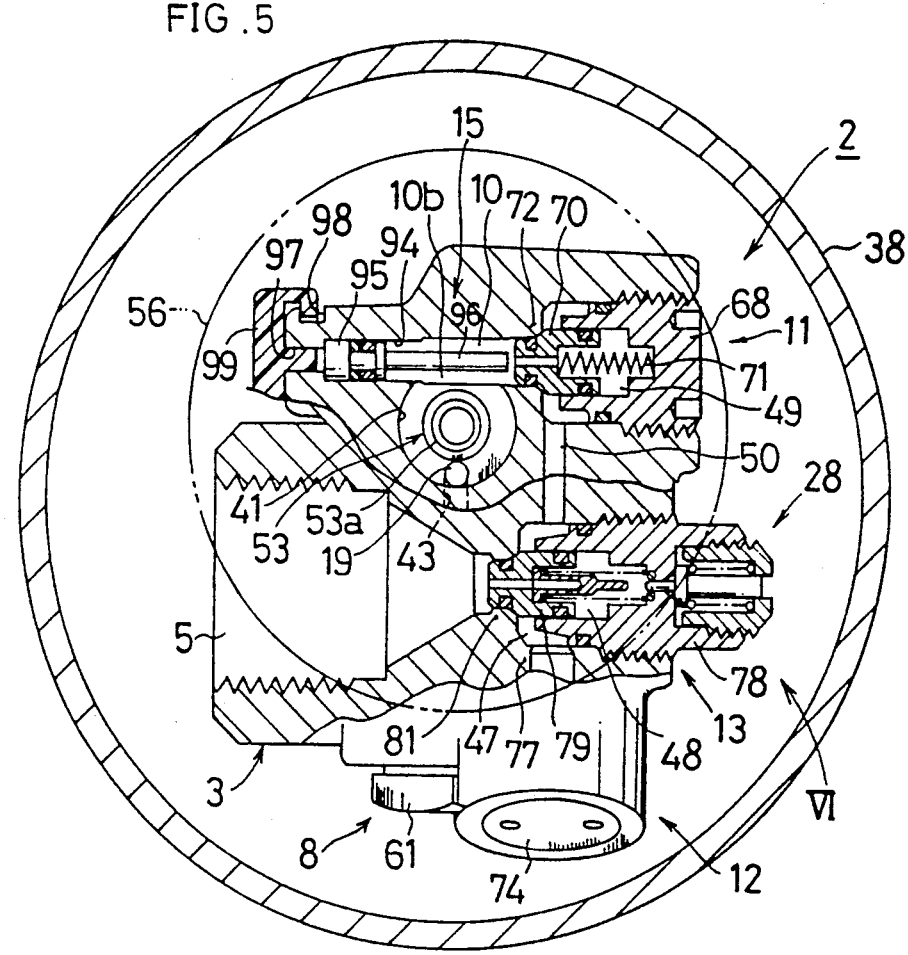
Figure 6:
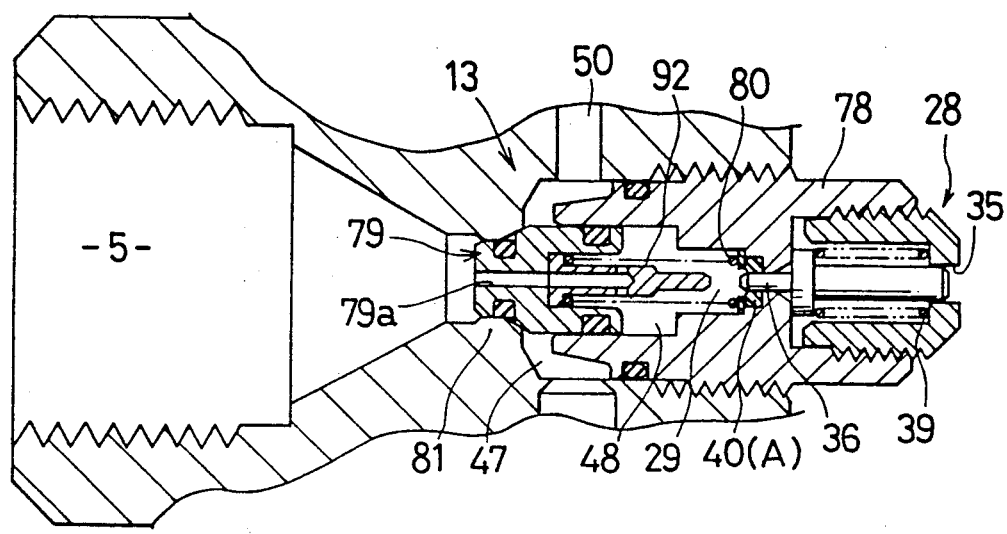
Figure 7:
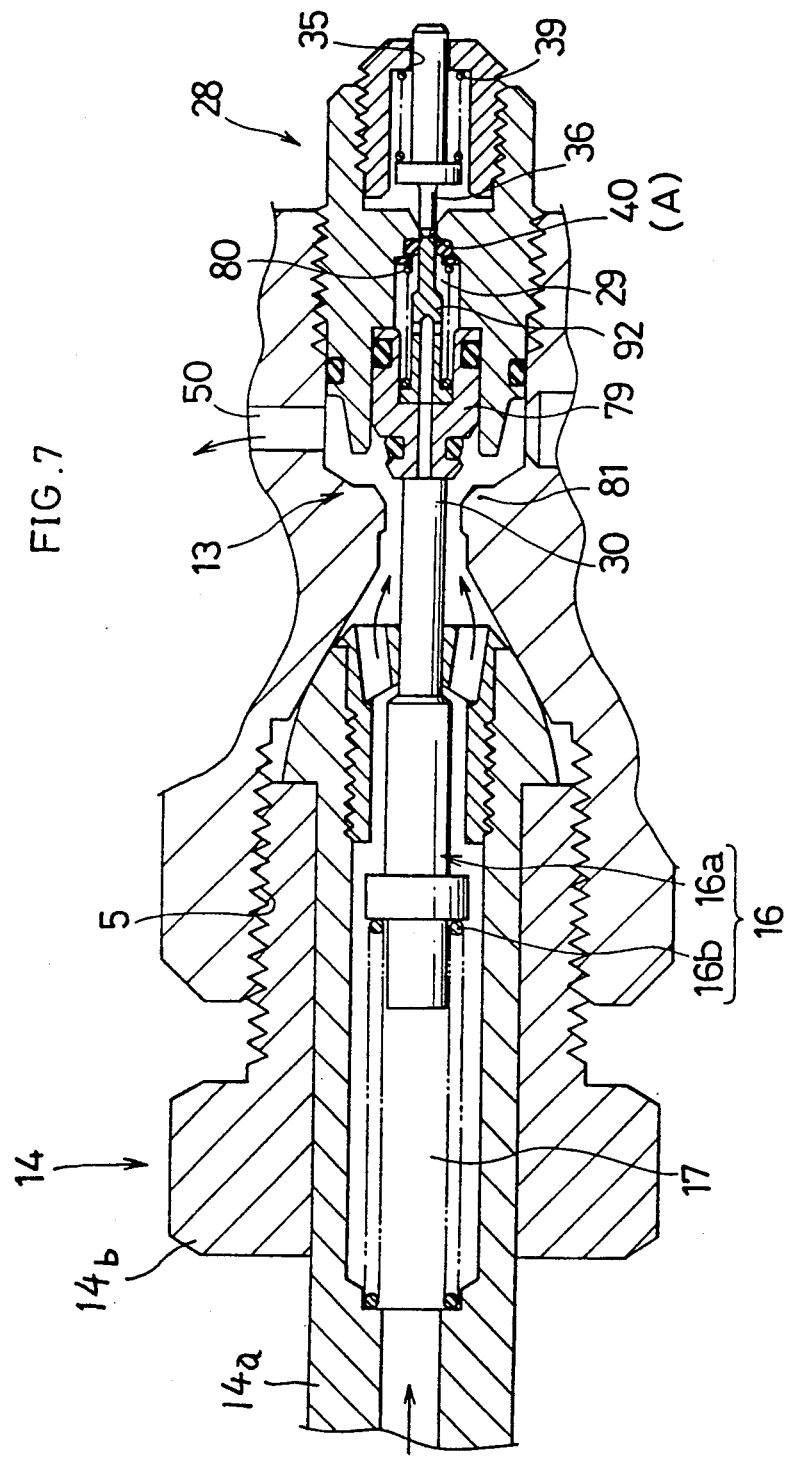

A concrete construction of the valve assembly 2 will be explained by FIGS. 3 through 8 with reference to FIGS. 1 and 2. FIG. 3 is a vertical sectional view of the valve assembly. FIG. 4 is a sectional view taken along the directed line IV—IV in FIG. 3, FIG. 5 is a sectional view taken along the directed line V—V in FIG. 3, FIG. 6 is an enlarged view of the directed portion VI in FIG. 5, FIG. 7 shows a gas charging state and is a view corresponding to FIG. 6, and FIG. 8 is an explanatory view of a vacuum suction operation.

In the valve assembly 2, a threaded leg portion 37 of the valve casing 3 is adapted to be threadably secured to a neck portion 1a of the gas cylinder 1. During the transportation and the storage of the gas cylinder 1, the valve assembly 2 is protected by threadably securing a protection cap 38 to an external peripheral portion of the neck portion 1a.

The gas inlet 4 is opened in the lower surface of the threaded leg portion 37 and the gas outlet 5 is opened laterally in a midway-height portion of the valve casing 3. The gas inlet 4 is connected to the gas outlet 5 through the stop-valve inlet passage 21, a stop valve chamber 41, an inlet passage 43, a pressure reducing valve chamber 44, the outlet passage 24, a second check valve seat 77, a third check valve inlet passage 47 and a third check valve seat 81 in order. The third check valve inlet passage 47 is communicated with the stop valve chamber 41 through the gas charging passage 10 and the first check valve 11 is disposed in a midway portion of the gas charging passage 10. The symbol 50 designates a first check valve inlet passage.

The stop valve 7 is adapted to open and close a closure member 51, which is inserted into the stop valve chamber 41 so as to be vertically movable, relative to a stop valve seat 53 by an opening or closing actuation means 52. That is, when a valve stem 55 supported by a valve cover 54 is turned by a handle 56, the closure member 51 threadably engaged with the stop valve chamber 41 is raised and lowered so as to bring a plastic valvular surface 57 of the closure member 51 into contact with or apart from the stop valve seat 53.

After completion of assembling of the valve assembly 2, when the stop valve 7 is closed, the valvular surface 57 is brought into strong contact with a protrusion 53a of the stop valve seat 53 so as to deform plastically, so that a fine annular groove is formed along the protrusion 53a in the valvular surface 57 (refer to FIG. 4). Thereupon, when the handle 56 is turned in the valve opening direction at the time of gas taking out, a valve-opening gap at the beginning of the manipulation becomes smaller. Therefore, the pressure of the outlet side of the stop valve 7 can be prevented from increasing abruptly.

The pressure reducing valve 8 is adapted to open and close a pressure reducing member 58 inserted into the pressure reducing valve chamber relative to a pressure reducing valve seat 60 by an action of a piston type actuating member 59. That is, the actuating member 59 is inserted hermetically into an actuation chamber 62 formed in a cover bolt 61 through a first sealing member 63 and a second sealing member 64. The actuating member 59 is resiliently urged left to the valve opening side by a counterbalancing spring 65 composed of a plurality of Belleville springs. The actuation chamber 62 is communicated with the outlet passage 24 through the gas inducting passage 66 and the pressure reducing valve chamber 44. The actuating member 59 is adapted to be pushed right to the valve closing side by a differential force between the gas pressures acting on both the sealing members 63, 64. By a differential force between the valve opening force exerted by the counterbalancing spring 65 and the valve closing force effected by the gas pressure, the pressure reducing member 58 is opened and closed relative to the pressure reducing valve seat 60.

The first check valve 11 is adapted to urge a first check valve member 70 inserted into the first check valve chamber 49 formed in the cover bolt 68 by a pressure within the valve chamber 49 and a first check spring 71 so as to be brought into contact with a first check valve seat 72 for valve closing. Also the second check valve 12 is adapted to urge a second check valve member 75 inserted into the second check valve chamber 46 formed in the cover bolt 74 by a pressure within the valve chamber 46 and a second check spring 76 so as to be brought into contact with a second check valve seat 77 for valve closing. Further, also the third check valve 13 is adapted to urge a third check valve member 79 inserted into the third check valve chamber 48 by a pressure within the valve chamber 48 and a third check spring 80 so as to be brought into contact with a third check valve seat 81 for valve closing.

The primary safety valve 23 has a burst plate 83 which serves to seal the gas inducing passage 25 and for which a backup is made by a meltable plug 84. The symbol 85 designates a spout.

The gas inducting passage 25 of the safety valve 26 is branched from the pressure reducing valve chamber 44 so as to be communicated with a space outside the valve casing 3 through the spout 85. The safety valve 26 is adapted to urge a piston portion 88 by a safety spring 89 so as to be brought into contact with a safety valve seat 90 made of an O-ring for valve closing. Incidentally, as mentioned above, the safety valve 26 may be omitted.

The gas inducting passage 29 of the secondary safety valve 28 is branched from the third check valve chamber 48 which is communicated with the gas outlet 5 and is communicated with the space outside the valve casing 3 through the spout 35. The secondary safety valve 28 is adapted to urge the piston portion 36 by the safety spring 39 so as to be brought into contact with a safety valve seat 40 made of the O-ring for valve closing. This safety valve seat 40 serves also as the opening or closing portion A while this opening or closing portion A and the gas outlet 5 are arranged in series and linearly. An opening or closing member 92 for opening and closing the opening or closing portion A is mounted within the third check member 79 so as to be resiliently urged toward the gas outlet 5 by the third check spring 80.

As shown in FIG. 7, the gas charging mouthpiece 14 is provided with a cylindrical mouthpiece body 14a, a tightening bolt 14b and the means 16. The means 16 is adapted to push a valve-opening member 16a inserted into the gas flow passage 17 by a spring 16b toward its leading end. The actuating portion 30 for closing the opening or closing portion A is constructed by the leading end portion of the valve opening member 16a.

The valve assembly filter 18 is mounted to the gas inlet 4. The pressure reducing valve primary filter 19 is inserted into a filter mounting hole 91 formed in the bottom wall portion of the stop valve chamber 41.

The means 15 for opening the first check valve 11 is provided with a cylinder bore 94 formed in series relative to the first check valve chamber 49 and the first check valve seat 72 and a piston 95 inserted hermetically into the cylinder bore 94. The gas charging passage outlet 10b is formed by an intersection portion which is formed by intersecting the cylinder bore 94 to the stop valve chamber 41. A piston rod 96 projected from the piston 95 toward one end side is opposed to the first check member 70 while the other end surface of the piston 95 is made to face the space outside the valve casing 3 through a communication port 97 formed in the other end side of the cylinder bore 94. The communication port 97 is covered by a dust-proof cap 99 engaged in a peripheral groove 98 of the valve casing 3.

The valve assembly 2 operates as follows.

When the gas is taken out from the gas cylinder 1, the valve stop member 51 is opened by the handle 56.

Thereupon, the gas within the gas cylinder 1 flows from the pressure reducing valve chamber 44 into the outlet passage 24 through the gas inlet 4, the stop-valve inlet passage 21, the stop valve chamber 41 and the inlet passage 43 in order after the pressure reducing member 58 has been pushed to open, then flows into the third check valve inlet passage 47 after the second check member 75 has been made to separate from the second check valve seat 77 against the second check spring 76 by the gas pressure and flows out of the gas outlet 5 after the third check member 79 has been made to separate from the third check valve seat 81 against the third check spring 80 by the gas pressure.

Under the open condition of the third check member 79, the opening or closing member 92 doesn't reach the position of the safety valve seat 40 (the opening or closing portion A). Therefore, when the pressure within the gas outlet 5 increases abnormally due to any reason, the abnormal pressure reaches the third check valve chamber 48 through a central port 79a of the third check member 79 to make the piston portion 36 of the secondary safety valve 28 separate from the safety valve seat 40.

Under this gas taking-out condition, the first check member 70 is brought into contact with the first check valve seat 72 for the valve closing by a resultant force of the pressure within the first check valve chamber 49 and the resilient force of the first check spring 71. During the gas taking-out, when the reversely flowing gas enters the gas outlet 5 due to any reason, a pressure of the reversely flowing gas introduced into the third check valve chamber 48 acts on the third check member 79 as a valve closing force in addition to the valve closing force of the third check spring 80 so as to bring the third check member 79 into contact with the third check valve seat 81 for closing.

When a residual pressure within the gas cylinder 1 decreases to a predetermined pressure due to repetition of the gas taking-out, the valve closing force of the second check spring 76 overcomes the valve opening force provided by the gas pressure of the outlet passage 24 so as to bring the second check member 75 into contact with the second check valve seat 77 for the valve closing while the valve closing force of the third check spring 80 overcomes the valve opening force provided by the gas pressure of the third check valve inlet passage 47 so as to bring the third check member 79 into contact with the third check valve seat 81 for the valve closing. Thereby, the residual pressure within the gas cylinder 1 is maintained at the predetermined pressure.

When the vacant gas cylinder 1 is charged with the high-pressure gas, as shown in FIG. 7, the gas charging mouthpiece 14 is connected to the peripheral wall of the gas outlet 5. Thereupon, by the valve opening member 16a provided in the mouthpiece 14, the third check member 79 is made to separate from the third check valve seat 81 while the opening or closing member 92 closes the opening or closing portion A. Under this condition, the valve closing member 51 is operated to open and then to supply the high-pressure gas to the gas charging mouthpiece 14. Thereupon, the high-pressure gas flows from the gas outlet 5 to the first check valve inlet passage 50 through the aperture of the third check valve seat 81, then flows into the stop valve chamber 41 after the gas pressure has pushed and opened the first check member 70 and is charged into the gas cylinder 1 from the gas inlet 4 through the stop valve inlet passage 21.

During that gas charging, the second check member 75 is brought into contact with the second check valve seat 77 for the valve closing by a resultant force of a pressure of the high-pressure gas introduced from the third check valve inlet passage 47 to the second check valve chamber 46 and a spring force of the second check spring 76.

Therefore, the new high-pressure gas can be prevented from flowing into the outlet side of the pressure reducing valve 8, so that it becomes possible to omit a filter from that outlet side and to manufacture the valve assembly 2 simply. The high-pressure gas supplied to the stop valve chamber 41 during the gas charging is reduced to a lower pressure during flowing from the inlet passage 43 to the pressure reducing valve chamber 44 and flows into the actuation chamber 62 at the lower pressure. Therefore, the valve closing force acting from the actuation chamber 62 to the actuating member 59 is small. As a result, it is possible to prevent damages of the pressure reducing member 58 and the pressure reducing valve seat 60 caused by their plastic deformations to elongate the service time of the pressure reducing valve 8.

Figure 8A:
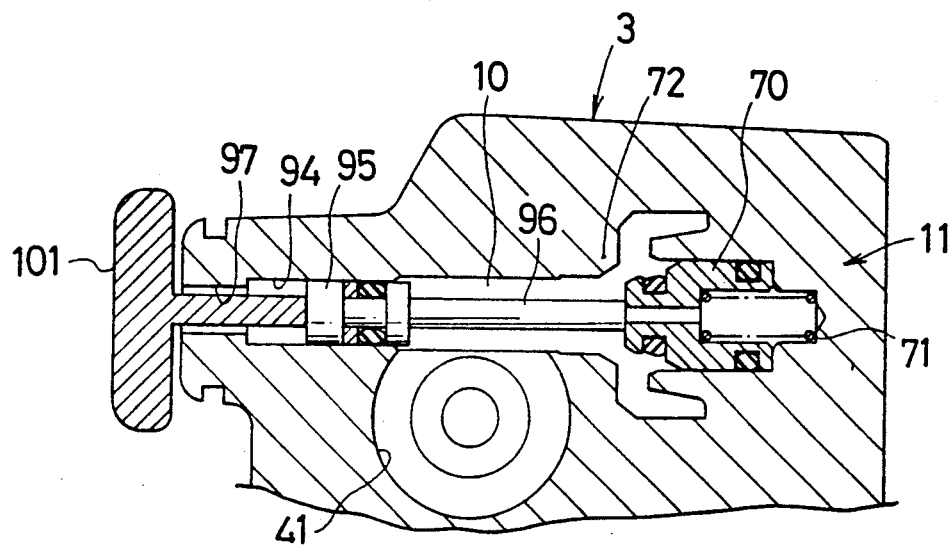
FIG. 8(a) shows a state of a valve opening operation.

When carrying out the vacuum suction of the gas cylinder 1 prior to the gas charging, the valve assembly 2 is operated as follows. Firstly, the dust-proof cap 99 is removed from the communication port 97. Subsequently, as shown in FIG. 8(a), an actuating member 101 is inserted into the cylinder bore 94 through the communication port 97 so as to make the first check member 70 separate from the first check valve seat 72 by the actuating member 101 through the piston 95 and the piston rod 96. Under this condition, the vacuum suction is carried out from the gas charging mouthpiece 14 by opening the third check member 79 and the closure member 51. Thereupon, the residual gas within the gas cylinder 1 is sucked to the outside from the gas inlet 4 through the stop valve chamber 41, the apertures of the first and the third check valve seats 72, 81 and the gas outlet 5.

Figure 8B:
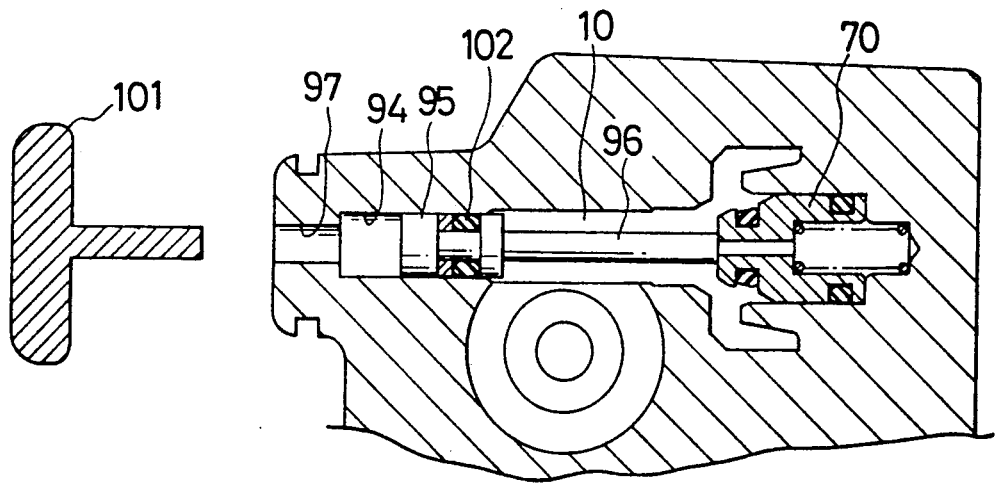
FIG. 8(b) shows a state of a vacuum suction operation.

During this vacuum suction operation, as shown in FIG. 8(b), the actuating member 101 is kept removed from the communication port 97. The piston 95 is pushed right toward the valve opening side by a differential force between the atmospheric pressure on the side of the communication port 97 and a negative pressure on the side of the gas charging passage 10 and is maintained in a valve opening posture by a friction force of an O-ring 102.

According to the above-mentioned embodiment, the following advantages can be obtained.

Since there is provided the means 15 for forcibly opening the first check valve 11, it becomes possible to easily detect a pressure of the gas cylinder 1 at the time of reception and a pressure thereof during storage and further it becomes possible to take out the gas from the gas cylinder 1 at a high-pressure as it is. Since the means 15 is constructed by the cylinder bore 94 and the piston 95, it can be manufactured in a simple and compact structure. Since a portion of the gas charging passage 10 is constructed by the intersecting portion between the cylinder bore 94 and the stop valve chamber 41, it becomes possible to manufacture the valve assembly 2 in a compact structure by omitting a communication passage between the stop valve chamber 41 and the gas charging passage 10.

When the reversely flowing gas enters the gas outlet 5 due to any reason, the reversely flowing gas can be prevented from entering the gas cylinder 1 by the third check valve 13 so as to prevent a contamination of the gas within the gas cylinder 1.

Since there is provided a pressure reducing valve primary filter 19 on the inlet side of the pressure reducing valve 8, it becomes possible to prevent a biting of foreign substances between the pressure reducing member 58 and the pressure reducing valve seat 60 at the time of the gas taking-out so as to keep the operation of the pressure reducing valve 8 in a good condition for a long time. Since the primary filter 19 is inserted into the filter mounting bore 91 formed in the bottom wall portion of the stop valve chamber 41, the filter mounting construction becomes simple.

Since the gas outlet 5 is opened laterally in the upper portion of the valve casing 3 and the stop valve chamber 41 is formed in an upwardly opened state in that upper portion while the pressure reducing valve chamber 44 and three check valve chambers 46, 48, 49 are formed in the peripheral wall of the stop valve chamber 41, it becomes possible to construct the valve assembly 2 in a compact arrangement and to accommodate the valve assembly 2 within the conventional protection cap 38.

FIGS. 9 through 12 show first through fourth variant examples of the actuating member 101 respectively while component members having the same constructions as those in the above-mentioned embodiment are designated by the same symbols in principle.

Figure 9:
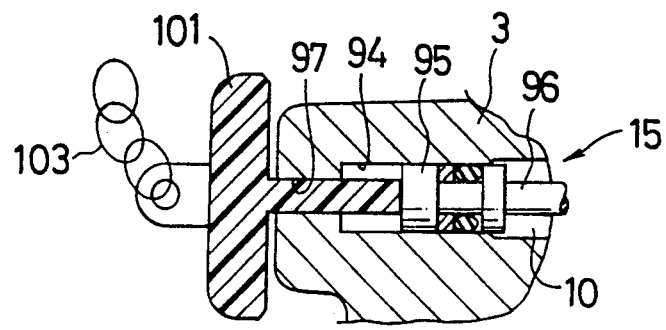
FIG. 9 shows a first variant example of an actuating member of the means for forcibly opening the valve and a view corresponding to FIG. 8(a)

In the first variant example shown in FIG. 9, the actuating member 101 is inserted into the communication port 97 so that the piston 95 can be held in the valve opening posture also by a friction force between both those members. The actuating member 101 is connected to the valve casing 3 by a chain 103.

Figure 10:
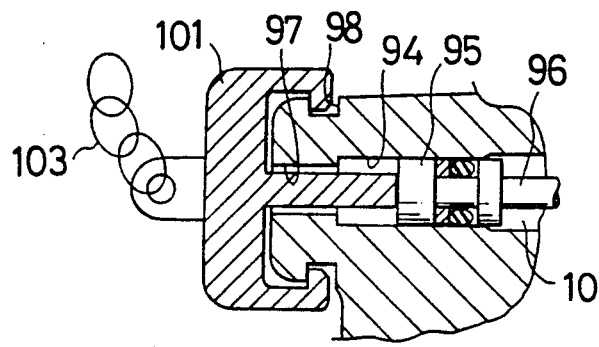
FIG. 10 shows a second variant example of the actuating member and is a view corresponding to FIG. 8(a)

In the second variant example shown in FIG. 10, the piston 95 is adapted to be held in the valve opening posture by fitting the actuating member 101 composed of a flexible cap into the peripheral groove 98. Even if an operator forgets removing of the actuating member 101 after completion of the vacuum suction working, the fitting between the actuating member 101 and the peripheral groove 98 can be cancelled automatically because the piston 95 is pushed left by a pressure acting in the gas charging passage 10 at the time of the gas charging.

Figure 11:
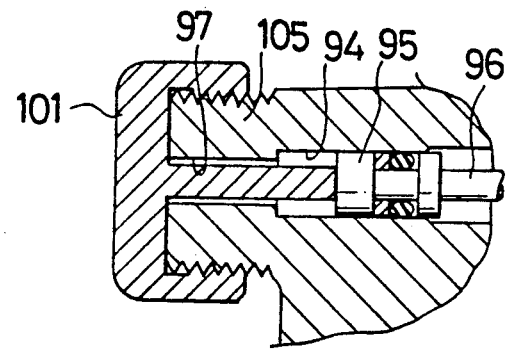
FIG. 11 shows a third variant example of the actuating member and is a view corresponding to FIG. 8(a)

In the third variant example shown in FIG. 11, the actuating member 101 composed of an internally threaded cap is adapted to be threadably secured to an externally threaded portion 105 of the peripheral wall of the communication port 97.

Since the piston 95 can be operated strongly, this construction is suitable for such a case as to detect the pressure within the gas cylinder 1 and such a case as to take out the gas within the gas cylinder 1 at the high pressure as it is as shown in FIG. 2.

Figure 12:
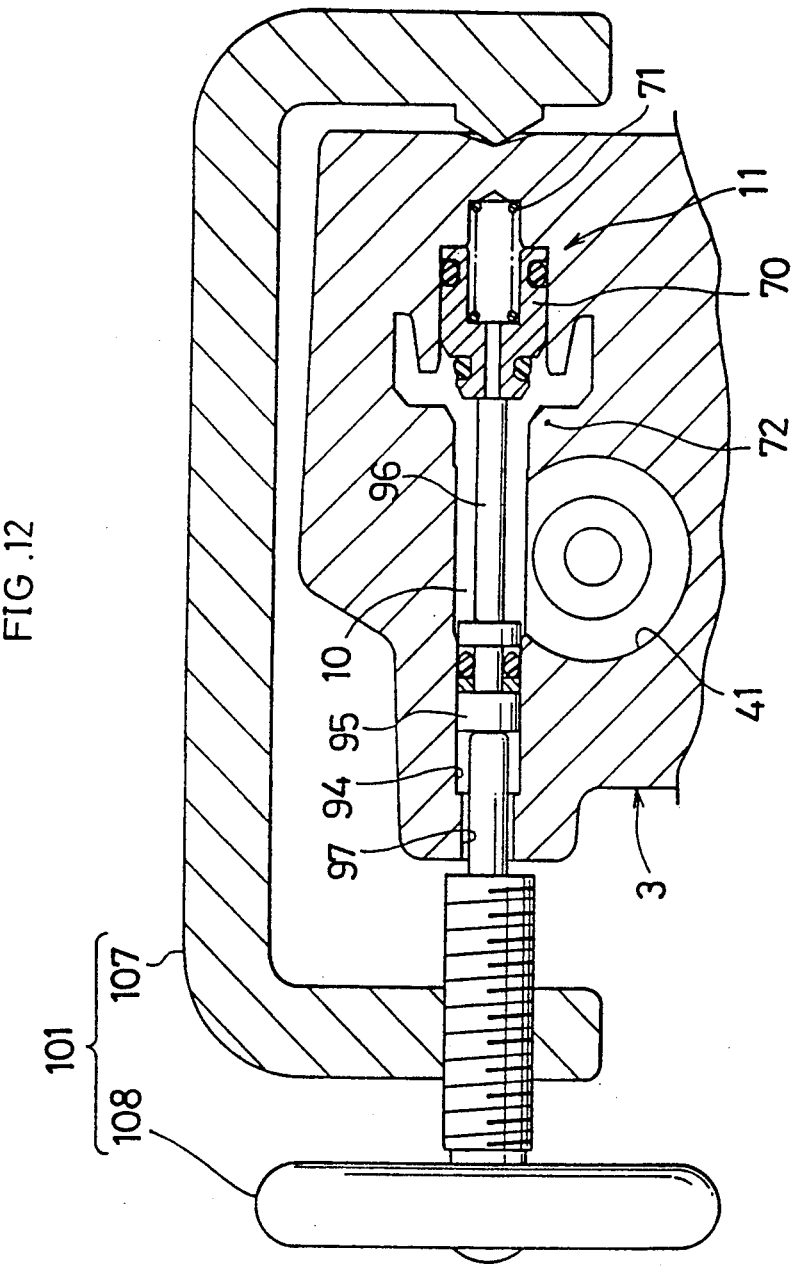
FIG. 12 shows a fourth variant example of the actuating member and is a view corresponding to FIG. 8(a)

In the fourth variant example shown in FIG. 12, the actuating member 101 is constructed by a C-shaped arm 107 and a push bolt 108 threadably fitted to the arm 107. The piston 95 can be operated strongly by the push bolt 108.

The actuating member 101 may be operated automatically by an air cylinder and the like instead of the manually acting member.

Figure 13A:
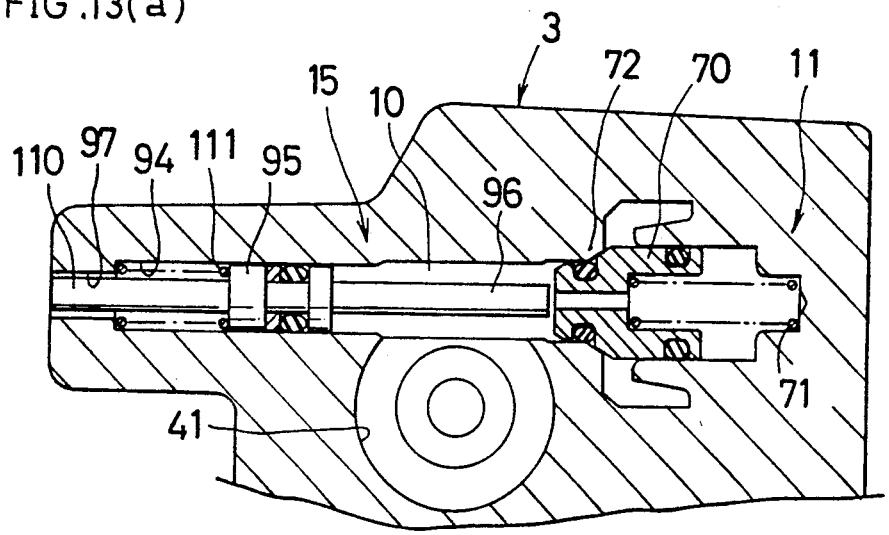
FIG. 13(a) shows an initial state.
Figure 13B:
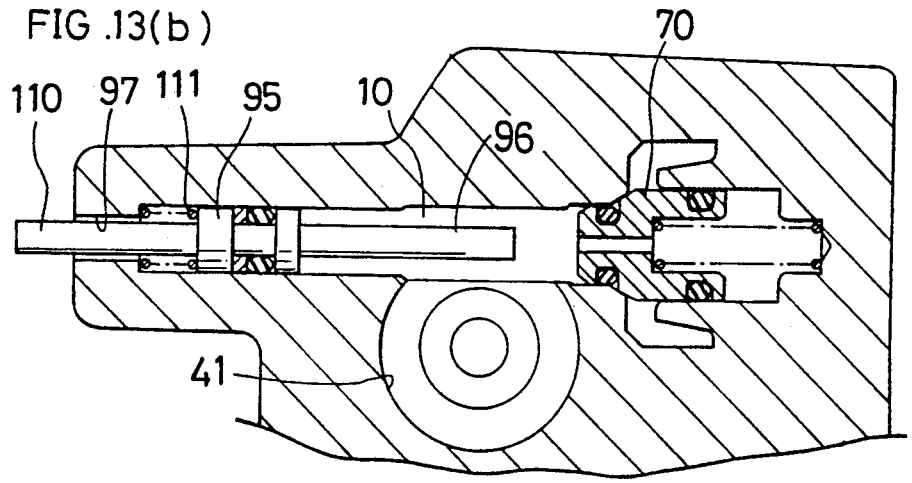
FIG. 13(b) shows a gas taking-out state.
Figure 13C:
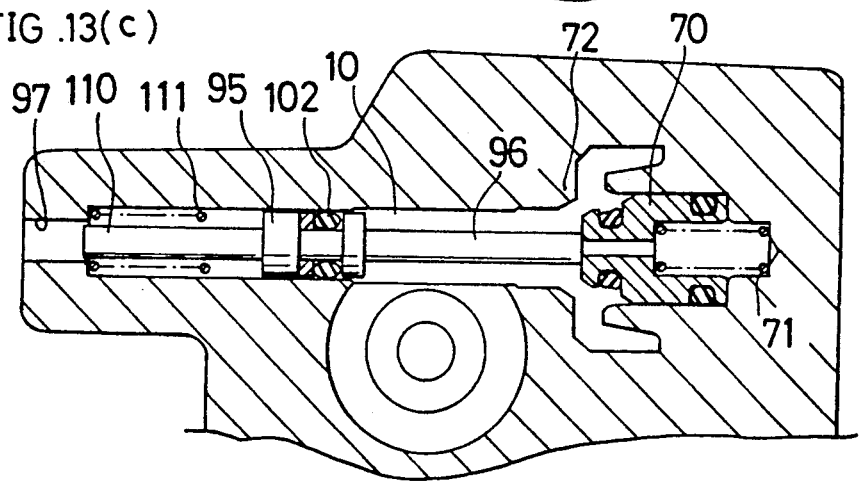
FIG. 13(c) shows a vacuum suction state.

FIG. 13 shows a variant example of the piston 95 of the means 15, which is adapted to be capable of indicating the pressure within the gas cylinder. As shown in an initial state of FIG. 13(a), an indication portion 110 is projected from the piston 95 into the communication port 97 and the piston 95 is resiliently urged to the side of the gas charging passage 10 by a spring 111. As shown in a gas taking-out state of FIG. 13(b), when the gas flows from the stop valve chamber 41 to the gas charging passage 10, the piston 95 is pushed leftwards by that gas pressure so that the indication portion 110 projects outside the communication port 97. The pressure within the gas cylinder can be indicated by a projecting degree thereof. In a vacuum suction state of FIG. 13(c), the piston 95 is pushed right to the valve opening side by a differential force between an atmospheric pressure on the side of the communication port 97 and a negative pressure on the side of the gas charging passage 10 and is held in a valve opening posture by a friction force of an O-ring 102. Incidentally, usable as the actuating member are the ones illustrated in the respective figures of FIGS. 9 through 12.

FIGS. 14 through 17 show variant examples of the opening or closing portion A respectively.

Figure 14:
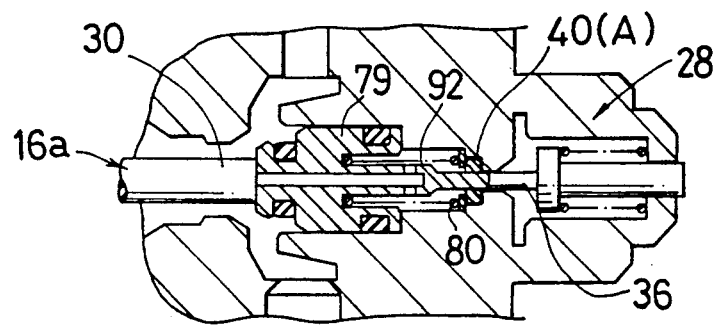
FIG. 14 shows a first variant example of an opening or closing portion of a secondary safety valve disposed in the valve assembly and is a view corresponding to FIG. 7.

In FIG. 14, the opening or closing portion A is adapted to be opened or closed by the opening or closing member 92 integrally formed with the third check member 79.

Figure 15:
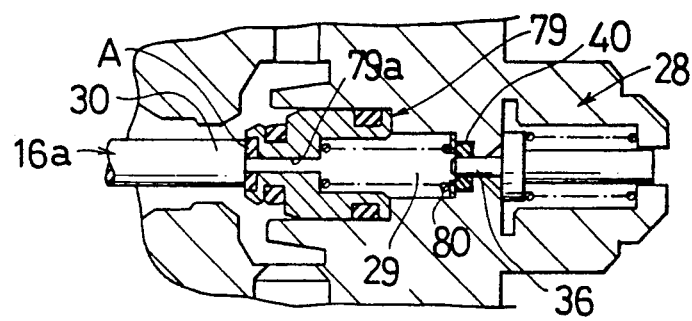
FIG. 15 shows a second variant example of the opening or closing portion and is a view corresponding to FIG. 7.

In FIG. 15, the opening or closing portion A composed of an elastic member is provided in a leading end portion of the peripheral wall of the central hole 79a of the third check member 79 while the opening or closing portion A is adapted to be closed by the actuating portion 30 of the valve opening member 16a.

Figure 16:
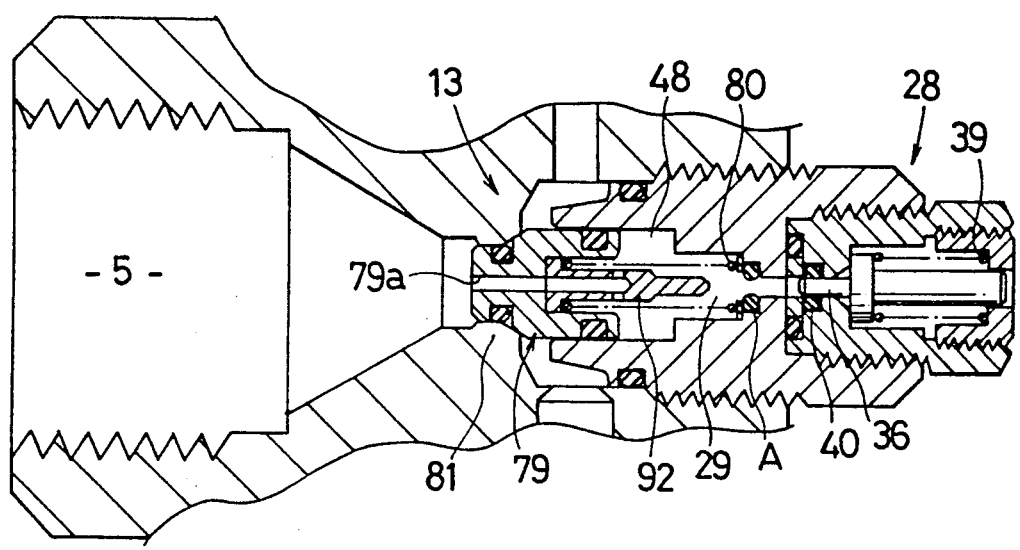
FIG. 16 shows a third variant example of the opening or closing portion and is a view corresponding to FIG. 7.

In FIG. 16, the opening or closing portion A of the gas inducing passage 29 is disposed at such a position remote from the safety valve seat 40 of the secondary safety valve 28.

Figure 17:
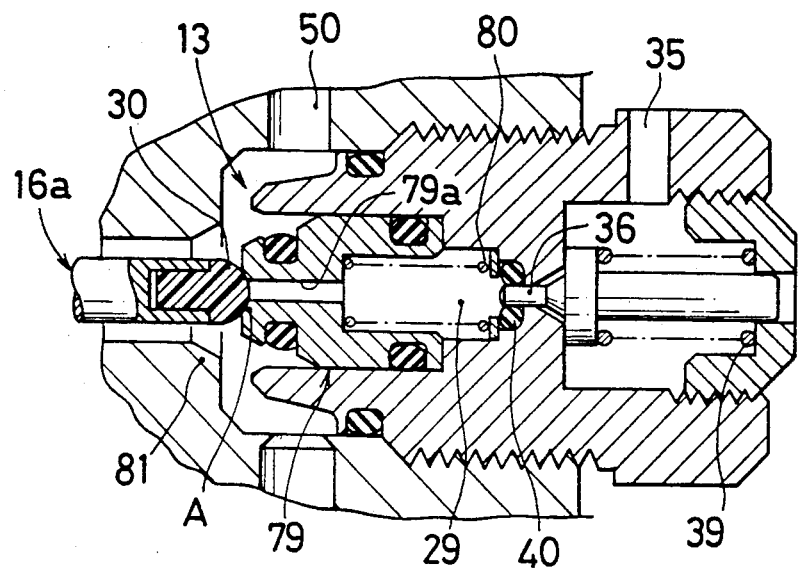
FIG. 17 shows a fourth variant example of the opening or closing portion and is a view corresponding to FIG. 7.

In FIG. 17, the opening or closing portion A is provided in a leading end portion of the peripheral wall of the central hole 79a of the third check member 79 while the actuating portion 30 of the valve opening member 16a is constructed by an elastic member. The actuating portion 30 is brought into contact with the opening or closing portion A for closing.

Figure 18:
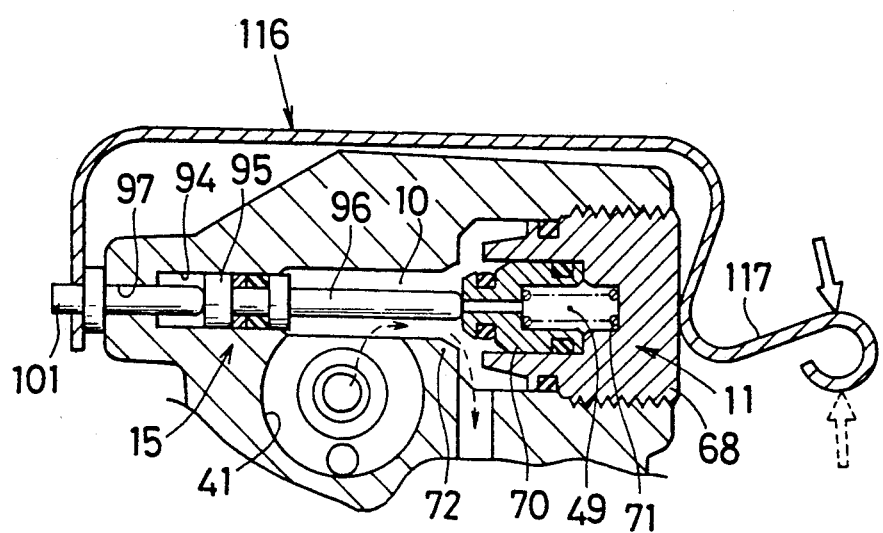
FIG. 18 shows another variant example of the actuating member of the means for forcibly opening the valve and is a view corresponding to FIG. 9.

FIG. 18 shows another variant example of the actuating member 101 for use in the means 15. The left end of a holder 116 comprising a leaf spring is fitted to the actuating member 101 while a V-shaped pushing portion 117 is formed in the right end of the holder 116. When the vacuum suction working is carried out, first the actuating member 101 is inserted into the cylinder bore 94 and then the pushing portion 117 of the holder 116 is made to externally engage with the end face of the cover bolt 68 (refer to the solid line arrow). Thereby, the piston 95 maintains the open condition of the first check member 70 through the piston rod 96. After the vacuum suction working, the pushing portion 117 of the holder 116 is made to disengage from the cover bolt 68 by pushing the pushing portion 117 as directed by the broken line arrow and then the actuating member 101 is pulled out from the cylinder bore 94.

Figure 19:
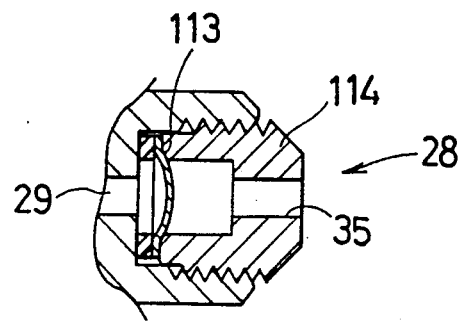
FIG. 19 is a view showing a variant example of the secondary safety valve.

FIG. 19 shows a variant example of the secondary safety valve 28. The secondary safety valve 28 comprises a burst plate 113 and a press nut 114.

Second Embodiment

Figure 20:
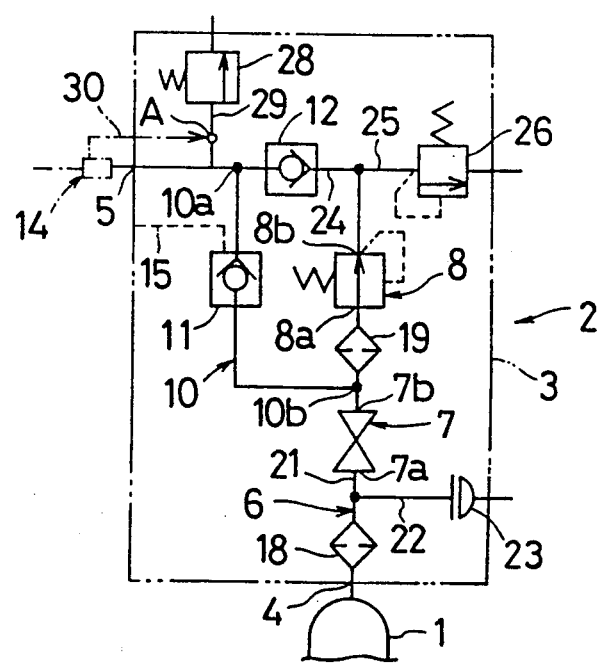
FIGS. 20 through 22 show a second embodiment of the valve assembly according to the present invention.
Figure 21:
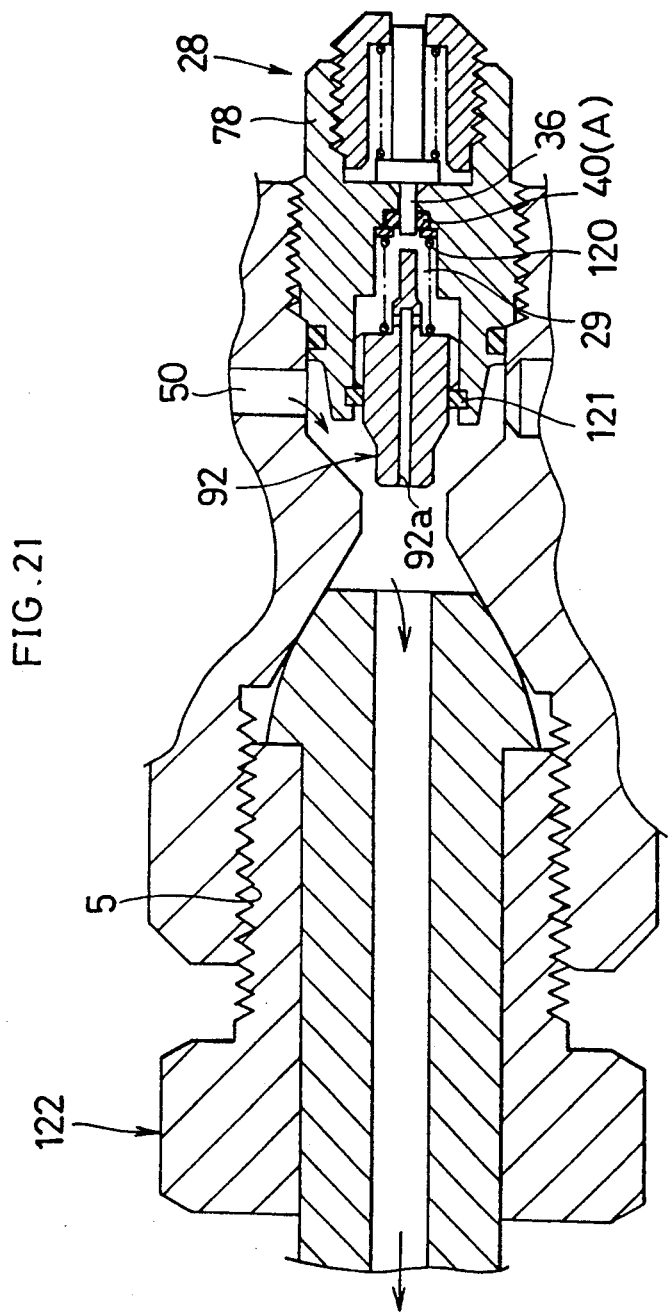
Figure 22:
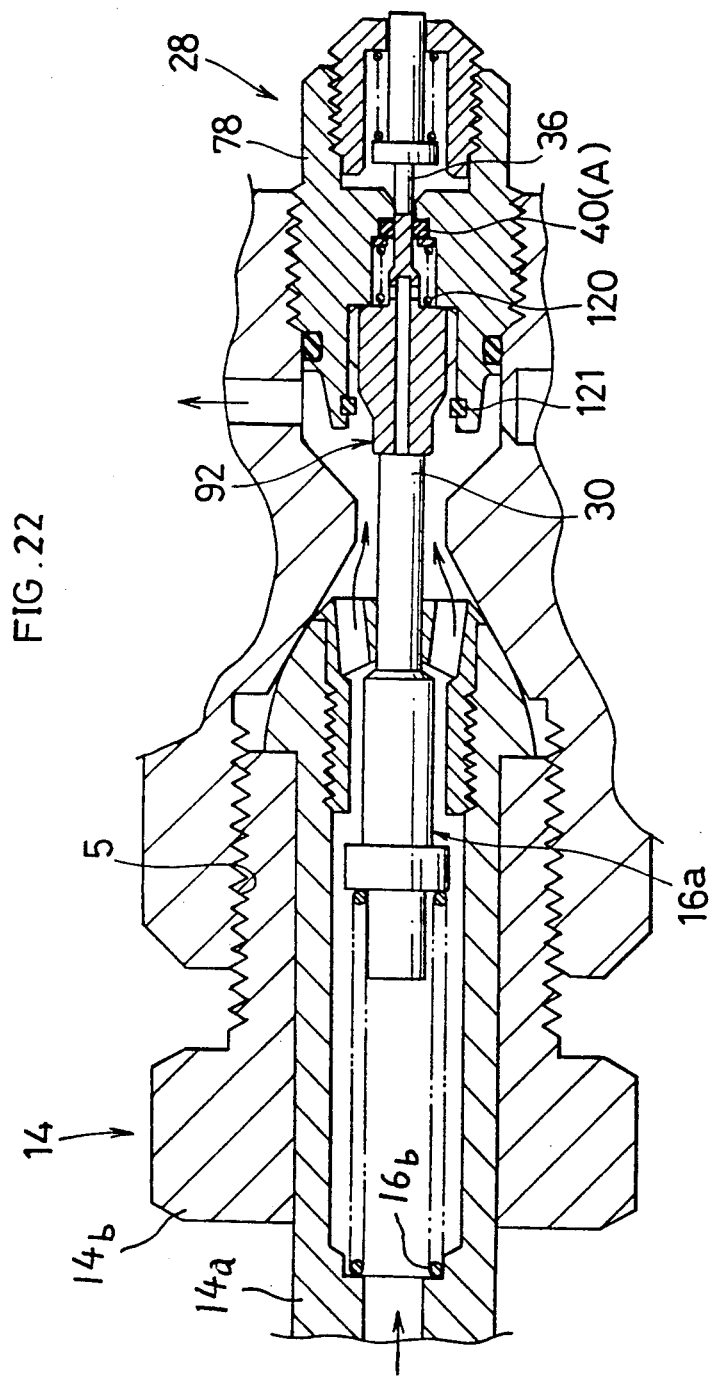

FIGS. 20 through 22 show a second embodiment of the present invention. In this embodiment, component members having the same construction as those in the first embodiment are designated by the same symbols.

As shown in the system diagram of FIG. 20, the third check valve 13 in FIG. 1 is omitted. The holding of the residual pressure of the gas cylinder 1 is made by a spring (herein, not illustrated) of the second check valve 12. The pressure within the gas cylinder 1 can be confirmed by opening the stop valve 7 and also opening the first check valve 11 by the forcibly valve-opening means 15. Other constructions are the same as those in FIG. 1.

As shown in FIG. 21, the opening or closing member 92 is inserted into the cover bolt 78 opposed to the gas outlet 5. The opening or closing member 92 is resiliently urged toward the gas outlet 5 by an opening spring 120. The symbol 121 designates a stopper and the symbol 122 designates a gas taking-out coupling. At the time of gas charging, as shown in FIG. 22, the gas charging mouthpiece 14 is connected to the peripheral wall of the gas outlet 5. Thereupon, the actuating portion 30 disposed in the leading end of the mouthpiece 14 moves the opening or closing member 92 rightwards against the opening spring 120 so that the opening or closing member 92 closes the opening or closing portion A. Incidentally, the gas charging mouthpiece 14 may have both the mouthpiece body 14a and the actuating member 16a formed integrally and may have the spring 16b omitted.

Figure 23:
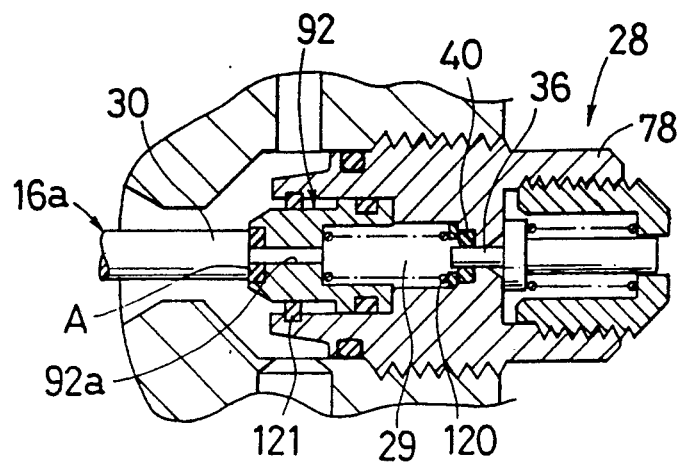
FIG. 23 shows a first variant example of the opening or closing portion of the secondary safety valve disposed in the valve assembly and is a view corresponding to FIG. 22.
Figure 24:
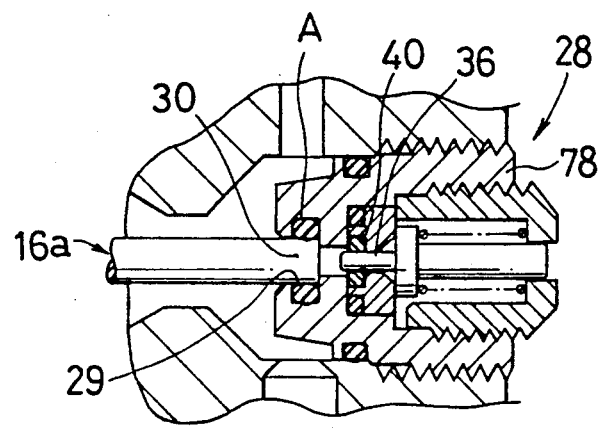
FIG. 24 shows a second variant example of the opening or closing portion and is a view corresponding to FIG. 22.

FIGS. 23 and 24 show variant examples of the opening or closing portion A respectively.

In FIG. 23, the opening or closing portion A composed of the elastic member is disposed in the leading end portion of the peripheral wall of the central hole 92a of the opening or closing member 92 and adapted to be closed by the actuating portion 30.

In FIG. 24, the opening or closing portion A made of the O-ring is disposed in the gas inducting passage 29 formed in the central portion of the cover bolt 78 and the actuating member 30 is fitted hermetically into the opening or closing portion A. Incidentally, the safety valve seat 40 may serve also as the opening or closing portion A while the safety valve seat 40 may be closed by the actuating member 30.

Figure 25:
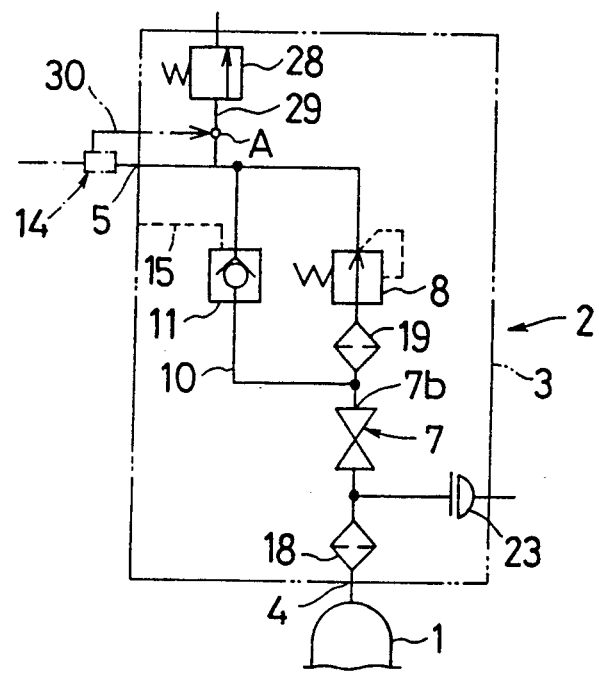
FIG. 25 is a system diagram showing a third embodiment of the valve assembly according to the present invention.
Figure 26:
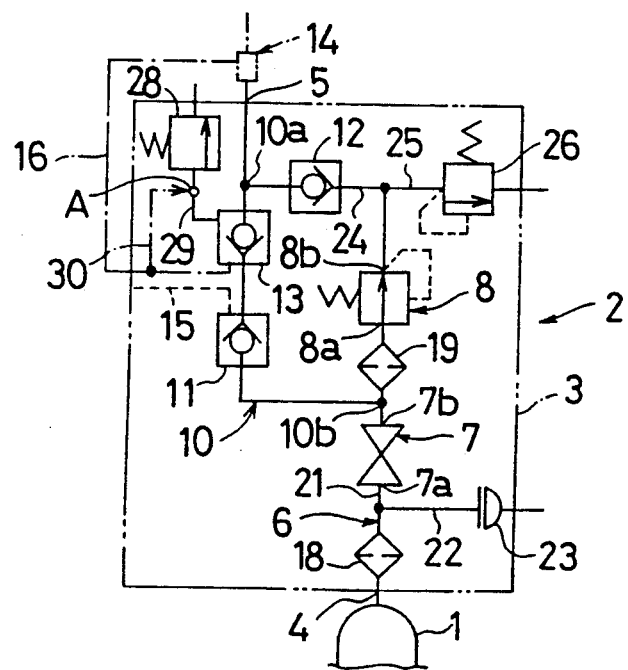
FIG. 26 is a system diagram showing a fourth embodiment of the valve assembly according to the present invention.

FIGS. 25 and 26 show other embodiments and are views corresponding to FIG. 1 and FIG. 20, respectively.

Third Embodiment

As shown in the system diagram of FIG. 25, the second check valve 12 and the safety valve 26 in FIG. 20 are omitted. Thereby, the construction of the valve assembly 2 can be simplified remarkably. Other constructions are the same as those in FIG. 20 while it may be supposed that the concrete constructions are those in FIGS. 21 through 24.

Fourth Embodiment

As shown in the system diagram of FIG. 26, the third check valve 13 is disposed between the inlet 10a of the gas charging passage 10 and the first check valve 11 while the means 16 for forcibly opening the third check valve 13 is disposed in the gas charging mouthpiece 14. In this case, since the residual pressure can be held by only a spring (not illustrated) of the second check valve 12, it becomes possible to make the residual pressure smaller in comparison with the one in FIG. 1. Other constructions are the same as those in FIG. 1.

Incidentally, though the stop valve 7 and the pressure reducing valve 8 are arranged in order from the gas inlet 4 in the respective embodiments, the pressure reducing valve and the stop valve may be arranged in order from the gas inlet 4.

As many different embodiments of the invention will be obvious to those skilled in the art, some of which have been disclosed or referred to herein, it is to be understood that the specific embodiments of the invention as presented herein are intended to be by way of illustration only and are not limiting on the invention, and it is to be understood that such embodiments, changes, or modifications may be made without departing from the spirit and scope of the invention as set forth in the claims appended hereto.

What is claimed is:

1. A valve assembly for a gas cylinder comprising a valve casing (3) within which a pressure reducing valve (8) is arranged in series relative to a stop valve (7) between a gas inlet (4) and a gas outlet (5), a gas charging mouthpiece (14) provided with an actuating portion (30) being adapted to be attachable to said gas outlet (5);
a gas charging passage (10) arranged in parallel to said pressure reducing valve (8);
a check valve (11) disposed in said gas charging passage (10) so as to prevent a flow from said gas inlet (4) to said gas outlet (5);
a secondary safety valve (28) adapted to release an increased pressure outside said valve casing (3) when a pressure in said gas outlet (5) increases above a predetermined value;
a gas inducting passage (29) for making said gas outlet (5) communicate with said secondary safety valve (28); and
an opening or closing portion (A) provided in said gas inducting passage (29) and adapted to be closed by said actuating portion (30) of said gas charging mouthpiece (14).

2. A valve assembly as set forth in claim 1, wherein said gas inlet (4), said stop valve (7), said pressure reducing valve (8) and said gas outlet (5) are arranged in series.

3. A valve assembly as set forth in claim 2, wherein said gas outlet (5) and said opening or closing portion (A) are arranged in series and linearly within said valve casing (3).

4. A valve assembly as set forth in claim 2, wherein a second check valve (12) for preventing a flow from said gas outlet (5) to an outlet (8b) of the pressure reducing valve (8) is disposed between the outlet (8b) and an inlet (10a) of said gas charging passage (10).

5. A valve assembly as set forth in claim 4, wherein a third check valve (13) for preventing a flow from said gas outlet (5) to said respective check valves (11)(12) is disposed between said first and said second check valves (11)(12) and said outlet (5), and a means (16) for forcibly opening said third check valve (13) is provided in said gas charging mouthpiece (14).

6. A valve assembly as set forth in claim 4, wherein a third check valve (13) for preventing a flow from the inlet (10a) of said gas charging passage (10) to said first check valve (11) is disposed between the inlet (10a) and said first check valve (11), and a means (16) for forcibly opening said third check valve (13) is provided in said gas charging mouthpiece (14).

7. A valve assembly as set forth in claim 1, wherein another means (15) for forcibly opening said first check valve (11) is provided in said valve casing (3).

8. A valve assembly as set forth in claim 7, wherein said another means (15) comprises a cylinder bore (94) provided in series relative to a first check valve chamber (49) and a first check valve seat (72) of said first check valve (11) and a piston (95) inserted hermetically into said cylinder bore (94), and one end surface of said piston (95) is made to face a first check member (70) of said first check valve (11) and the other end surface of the piston (95) is made to face a space outside said valve casing (3) through said cylinder bore (94).

9. A valve assembly as set forth in claim 8, wherein said cylinder bore (94) is made to intersect to a stop valve chamber (41) of said stop valve (7) and a portion of said gas charging passage (10) comprises that intersecting portion.

10. A valve assembly as set forth in claim 1, wherein a gas inducting passage (25) of a safety valve (26) is made to communicate with the outlet (8b) of said pressure reducing valve (8).

* * * * *